United States Patent
Jiang

(10) Patent No.: US 8,163,069 B2
(45) Date of Patent: Apr. 24, 2012

(54) CARBOXYLIC ACID SALT ARTICLES AND METHODS OF MAKING AND USING THEM

(75) Inventor: Dayue David Jiang, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 389 days.

(21) Appl. No.: 12/624,968

(22) Filed: Nov. 24, 2009

(65) Prior Publication Data

US 2011/0120306 A1 May 26, 2011

(51) Int. Cl.
*B01J 20/22* (2006.01)
*B01D 53/04* (2006.01)

(52) U.S. Cl. .............................. 95/136; 95/139; 423/230

(58) Field of Classification Search .............. 95/90, 136, 95/139, 148; 96/108, 154; 423/230; 428/116; 252/184
See application file for complete search history.

(56) References Cited

U.S. PATENT DOCUMENTS

| 3,532,637 | A | | 10/1970 | Zeff et al. ...................... 252/190 |
| 5,231,063 | A | | 7/1993 | Fukumoto et al. ............... 502/62 |
| 5,288,306 | A | * | 2/1994 | Aibe et al. ........................ 95/141 |
| 5,603,927 | A | | 2/1997 | Fukumoto et al. ........... 424/76.1 |
| 6,099,621 | A | | 8/2000 | Ho .................................. 95/139 |
| 6,447,845 | B1 | | 9/2002 | Nanavati et al. ............ 427/383.5 |
| 6,547,854 | B1 | | 4/2003 | Gray et al. ........................ 95/139 |
| 6,767,391 | B2 | * | 7/2004 | Tanaka et al. .................... 96/115 |
| 6,908,497 | B1 | | 6/2005 | Sirwardane ...................... 95/136 |
| 7,288,136 | B1 | | 10/2007 | Gray et al. ........................ 95/139 |
| 2008/0125314 | A1 | | 5/2008 | Shim et al. ...................... 502/401 |
| 2008/0236389 | A1 | | 10/2008 | Leedy et al. ........................ 95/95 |
| 2009/0143506 | A1 | | 6/2009 | Harashina ........................ 524/91 |
| 2010/0212495 | A1 | * | 8/2010 | Gadkaree et al. ............... 95/139 |

FOREIGN PATENT DOCUMENTS

| JP | 7-204259 | 8/1995 |
| JP | 2001-137703 | 5/2001 |
| WO | 03/095071 | 11/2003 |
| WO | 2005/108297 | 11/2005 |
| WO | 2008/099604 | 8/2008 |

OTHER PUBLICATIONS

Machine translated abstract of JP7-204259, published Aug. 1995.
Machine translated abstract of JP2001-137703, published May 2001.
XP-002629477; WPI/Thomson; Thomson Scientific, London, GB; Week 199537, Jul. 1995.

* cited by examiner

*Primary Examiner* — Frank Lawrence, Jr.
(74) *Attorney, Agent, or Firm* — Susan S. Wilks

(57) ABSTRACT

An article comprising a substrate; and a carboxylic acid alkali salt disposed on the substrate, wherein the carboxylic acid alkali salt is derived from a carboxylic acid having at least one dissociation constant greater than or equal to 5. The article may be useful, for example, in the removal of an acid gas component from a gas.

23 Claims, No Drawings

CARBOXYLIC ACID SALT ARTICLES AND METHODS OF MAKING AND USING THEM

FIELD OF THE DISCLOSURE

This disclosure relates to carboxylic acid salt articles useful, for example, for the removal of an acid gas component from a gas.

BACKGROUND $CO_2$ has been claimed to be the primary source in global warming (the green house effect). Many industrial processes, such as coal gasification, biomass gasification, steam reforming of hydrocarbons, partial oxidation of natural gas, and like processes, produce a great amount of $CO_2$, $H_2S$ and other acidic gas containing gas streams. It is therefore desirable to remove and/or capture $CO_2$ and/or $H_2S$ and other acidic gases from those gas mixtures.

SUMMARY

The present inventor has now developed new articles useful, for example, for the removal of acid gas components, such as $CO_2$ from a gas. An exemplary article comprises a substrate and a solid carboxylic acid alkali salt disposed on the substrate, wherein the solid carboxylic acid alkali salt is derived from a carboxylic acid having at least one dissociation constant greater than or equal to 5.

The articles described herein may be useful, for example, in the removal of an acid gas component from a gas. One exemplary method comprises providing an article comprising a substrate and a solid carboxylic acid alkali salt disposed on the substrate, wherein the solid carboxylic acid alkali salt is derived from a carboxylic acid having at least one dissociation constant greater than or equal to 5; and contacting a gas comprising an acid gas component with the article to remove at least a portion of the acid gas component from the gas. Another exemplary method comprises contacting a gas comprising an acid gas component with a solid carboxylic acid alkali salt to remove at least a portion of the acid gas component from the gas; wherein the solid carboxylic acid alkali salt is derived from a carboxylic acid having at least one dissociation constant greater than or equal to 5.

Additional features and advantages will be set forth in the detailed description which follows, and in part will be readily apparent to those skilled in the art from the description or recognized by practicing the embodiments as described in the written description and claims hereof.

It is to be understood that both the foregoing general description and the following detailed description are merely exemplary, and are intended to provide an overview or framework to understand the nature and character of the claims.

DETAILED DESCRIPTION

One embodiment is an article comprising a substrate and a solid carboxylic acid alkali salt disposed on the substrate, wherein the solid carboxylic acid alkali salt is derived from a carboxylic acid having at least one dissociation constant greater than or equal to 5. In some embodiments, the substrate comprises a glass or ceramic. The substrate may be porous or non-porous. The substrate may be in any appropriate form. In one embodiment, the substrate is in the form of fibrous material, such as a glass wool. In another embodiment, the substrate is in the form of a flow-through substrate, such as a ceramic honeycomb. In other embodiments, the substrate is substantially planar, such as in the form of a plate. The substrate may comprise organic materials, for example, lignocellular material (e.g. wood powder) or polymer (e.g. polymeric foam).

The term "flow-through substrate" as used herein means a shaped body comprising inner passageways, such as straight or serpentine channels and/or porous networks that would permit the flow of a gas through the body. The flow-through substrate comprises a dimension in the flow-through direction of at least 1 cm, at least 2 cm, at least 3 cm, at least 4 cm, at least 5 cm, at least 6 cm, at least 7 cm, at least 8 cm, at least 9 cm, or at least 10 cm from the inlet to the outlet.

In one embodiment, the flow-through substrate has a honeycomb structure comprising an inlet end, an outlet end, and inner channels extending from the inlet end to the outlet end. In one embodiment, the honeycomb comprises a multiplicity of cells extending from the inlet end to the outlet end, the cells being defined by intersecting cell walls. The honeycomb substrate could optionally comprise one or more selectively plugged honeycomb substrate cell ends to provide a wall flow-through structure that allows for more intimate contact between the gas and cell walls.

The carboxylic acid alkali salt is a salt derived from a carboxylic acid. The carboxylic acid alkali salt may be derived from carboxylic acids having at least one dissociation constant greater than or equal to 5, for instance, succinic acid, adipic acid, maleic acid, glutaric acid, itaconic acid, heptanedioic acid, o-phthalic acid, or methylsuccininc acid. Mono-, di-, or other multi-carboxylic acids may be used to prepare the carboxylic acid alkali salt. Di- or other multi-carboxylic acids have at least one dissociation constant greater than or equal to 5, for example two or three dissociation constants greater than or equal to 5, and may also have one or more dissociation constants less than 5. In one embodiment, the carboxylic acid alkali salt is a carboxylic acid potassium salt, prepared via reaction between potassium hydroxide in solution and a carboxylic acid. In another embodiment, the carboxylic acid alkali salt is a carboxylic acid sodium salt, prepared via reaction between sodium hydroxide in solution and a carboxylic acid.

Another embodiment is a method of making an article comprising a substrate and a solid carboxylic acid alkali salt disposed on the substrate, wherein the solid carboxylic acid alkali salt is derived from a carboxylic acid having at least one dissociation constant greater than or equal to 5, which comprises providing an substrate; applying a carboxylic acid alkali salt solution to the substrate to form a coated substrate; and drying the coated substrate. In this method, the substrate and solid carboxylic acid alkali salt may be selected, for instance, from the substrates and solid carboxylic acid alkali salts described above.

The solid carboxylic acid alkali salt in this method forms a coating on the substrate. The term "coating" as used herein means that solid carboxylic acid alkali salt is disposed on an exposed surface of the substrate. The coating may coat all or a portion of the surface of the substrate, and may impregnate the substrate to any extent if the surface of the substrate is porous.

The carboxylic acid alkali salt solution may be prepared, for example, by mixing a carboxylic acid and a solution of potassium hydroxide in any molar ration, such as at a molar ratio of about 1:1 COOH to OH in a solvent, such as, water. The pH of the resulting solution can be adjusted using the potassium hydroxide solution and/or the carboxylic acid to fall within the range of 8 to 14. In some embodiments sodium hydroxide can be used instead of potassium hydroxide.

The carboxylic acid alkali salt solution may be applied to the substrate in any suitable manner, for example, spraying or dipping. In some embodiments, a substrate is submerged in the carboxylic acid alkali salt solution for any appropriate length of time, such as, 10-15 seconds. The coated substrate is then allowed to dry at room temperature. The coated substrate may also be dried in a heated environment, for example, an oven. It is during the drying process that the solid carboxylic acid alkali salt is formed on the substrate. A complete evaporation of water during the drying process is not required.

An article including any combination of the embodiments described above may be used in a method including contacting a gas comprising an acid gas component with the article to remove at least a portion of the acid gas component from the gas. One embodiment is a method comprising contacting a gas comprising an acid gas component with an article comprising a substrate and a solid carboxylic acid alkali salt disposed on the substrate, wherein the solid carboxylic acid alkali salt is derived from a carboxylic acid having at least one dissociation constant greater than or equal to 5; to remove at least a portion of the acid gas component from the gas. The gas may be in the form of a gas or a gas mixture. The gas or gas mixture may also contain another phase, such as a solid particulate in either a gas or liquid, or droplets of liquid in a gas. Contacting the gas with the article may be done by, for example, passing a stream of the gas across an external surface of the article, or passing a stream of gas through an internal volume of the article. In one embodiment, contacting the gas with the article occurs at a temperature of from 0° C. to 100° C., for example 25° C., 50° C., or 75° C.

An acid gas is one that, when dissolved in a solvent, leads to a solution with a pH less than 7. Exemplary acid gases include $H_2S$ and $CO_2$. The acid gas component may be present in the gas being treated in any proportion. The acid gas may be removed from the gas via adsorption, absorption, or other entrapment of the acid gas on the article, either physically, chemically, or both physically and chemically. At least a portion of the acid gas component is removed from the gas, for example, some, or all of the acid gas. In some embodiments, the article removes at least 5%, at least 10%, at least 20%, at least 50%, at least 70%, or at least 90% of the acid gas component from the gas. In some embodiments, $H_2S$ is removed from the gas. In other embodiments, $CO_2$ is removed from the gas. The article is capable of capturing the acid gas component in a humidified or dry environment.

Another embodiment is a method comprising contacting a gas comprising an acid gas component with a solid carboxylic acid alkali salt to remove at least a portion of the acid gas component from the gas, wherein the solid carboxylic acid alkali salt is derived from a carboxylic acid having at least one dissociation constant greater than or equal to 5. For example, the solid carboxylic acid alkali salt may be used to remove an acid gas component from a gas without the use of a substrate, or with the solid carboxylic acid alkali salt disposed on an inorganic or organic substrate, including any of the substrates mentioned above. The solid carboxylic acid alkali salt may be in any appropriate form, such as in the form of a powder or in the form of a shaped article formed from the solid carboxylic acid alkali salt with or without the addition of a binder. Examples of such shaped articles include pellets or flow-through substrates. The carboxylic acid alkali salt may be selected from the carboxylic acid alkali salts described previously. The solid carboxylic acid alkali salt may be prepared by any suitable technique, such as by precipitating it from a carboxylic acid alkali salt solution.

Further embodiments comprise regenerating any of the above-described articles or carboxylic acid alkali salts by removing at least a portion of the acid gas from the article or carboxylic acid alkali salt. In one embodiment, regenerating the article or carboxylic acid alkali salt comprises heating the article or carboxylic acid alkali salt to a temperature sufficient to remove the acid gas. It should be appreciated that a sufficient temperature to remove the acid gas will depend, in part, on the amount of acid gas that is present. In one embodiment, a sufficient temperature can comprise heating the article or carboxylic acid alkali salt at a temperature above 100° C., for example 130° C., 150° C., or 170° C. Heating of the article or carboxylic acid alkali salt can be achieved by any suitable means, for example, by heating in an oven, or by passing a stream of a heated gas across an external surface of the article or carboxylic acid alkali salt, or through an internal volume of an article.

An alternative embodiment comprises regenerating the article or carboxylic acid alkali salt without external heating. The article or carboxylic acid alkali salt may be regenerated by contacting the article or carboxylic acid alkali salt with a solvent, such as water.

The carboxylic acid alkali salt may or may not be chemically bound to the substrate. In some embodiments, the carboxylic acid alkali salt coating may be removed from the substrate by any suitable technique, for example, by washing. In some embodiments, the carboxylic acid alkali salt coating is removed from the substrate, allowing the substrate to be recoated with a new carboxylic acid alkali salt solution.

Various embodiments will be further clarified by the following examples.

EXAMPLES

A solution of 20% potassium salt of oxalic acid (OA) was prepared by mixing oxalic acid and a 45% solution of potassium hydroxide at a molar ratio of 1:1 COOH to OH in water. The pH of the resulting solution was adjusted using KOH solution and/or the carboxylic acid to fall within the range of 8 to 14. Glass wool filter paper was submerged into the potassium salt solution for 10-15 seconds and then dried at room temperature overnight. Before $CO_2$ capture testing the coated glass wool filter paper was dried in an oven with forced air at 100° C. for 15 minutes. The amount of potassium salt of oxalic acid added to the glass wool filter paper was determined by mass difference. To evaluate its ability to capture $CO_2$, the coated glass wool filter paper was placed in a humidified $CO_2$ atmosphere for 30 minutes, with a small back pressure applied. The coated glass wool filter paper was removed and allowed to dry at room temperature overnight. Mass of the coated glass wool filter paper was measured immediately after removal from $CO_2$ atmosphere, after drying overnight, and after drying at 100° C. for 15 minutes. An increase in mass of the glass wool filter paper was observed after exposure to the humidified $CO_2$ atmosphere. The added mass was lost after exposure to drying at 100° C. for 15 minutes. Control samples were also tested in humidified nitrogen or air atmosphere. No mass change was observed in the control samples.

The above process was repeated using potassium salts of terephthalic acid (TPA), butanetetracarboxylic acid (BTCA), polyacrylic acid (PAA), succinic acid (SA), and adipic acid (AA). The $CO_2$ weight gain results are summarized in Table 1.

TABLE 1

|  | % weight gain immediately after $CO_2$ testing | % weight gain after drying at RT, 2 hours | % weight gain after drying at 100° C., 15 min |
|---|---|---|---|
| Potassium salt of OA | 8.8 | 8.5 | 0 |
| Potassium salt of TPA | 0 | 0 | 0 |
| Potassium salt of BTCA | 9.7 | 9.5 | 0 |
| Potassium salt of PAA | 12.5 | 11.6 | 0 |
| Potassium salt of SA | 16.6 | 16.2 | 13.5 |
| Potassium salt of AA | 12.5 | 12.2 | 11.8 |

The samples coated with potassium salt of SA and potassium salt of AA were capable of retaining the captured $CO_2$ after drying at 100° C. for 15 minutes. The samples coated with potassium salts of OA, BTCA, and PAA returned to before testing masses after drying at 100° C. for 15 minutes. The potassium salt of TPA did not show any increase in mass after $CO_2$ testing.

A qualitative test was also conducted on $CO_2$ exposed samples using barium hydroxide, $Ba(OH)_2$. Samples obtained immediately after $CO_2$ testing were submerged in water and shaken by hand to dissolve the potassium salts. Bubbling was observed when the samples of potassium salts of SA and AA were added to the water. After dissolving the potassium salts from the substrate, a few drops of saturated $Ba(OH)_2$ solution were added to the water containing the dissolved potassium salts and a cloudy appearance was observed due to the formation of finely dispersed insoluble $BaCO_3$. The control samples exposed to $N_2$ or air were also tested in the same manner; the water containing the control samples remained clear during this test and did not become cloudy.

It should be understood that while the invention has been described in detail with respect to certain illustrative embodiments thereof, it should not be considered limited to such, as numerous modifications are possible without departing from the broad spirit and scope of the invention as defined in the appended claims.

Unless otherwise indicated, all numbers used on the specification and claims are to be understood as being modified in all instances by the term "about", whether or not so stated. It should also be understood that the precise numerical values used on the specification and claims form additional embodiments of the invention.

What is claimed is:

1. An article comprising:
   a substrate; and
   a solid carboxylic acid alkali salt disposed on the substrate;
      wherein the solid carboxylic acid alkali salt is derived from a carboxylic acid having at least one dissociation constant greater than or equal to 5.

2. The article of claim 1, wherein the substrate is in the form of a honeycomb.

3. The article of claim 1, wherein the substrate comprises glass wool.

4. The article of claim 1, wherein the solid carboxylic acid alkali salt is a carboxylic acid potassium salt.

5. The article of claim 1, wherein the solid carboxylic acid alkali salt is a carboxylic acid sodium salt.

6. The article of claim 1, wherein the solid carboxylic acid alkali salt is derived from a monocarboxylic acid.

7. The article of claim 1, wherein the solid carboxylic acid alkali salt is derived from a dicarboxylic acid or a multicarboxylic acid.

8. The article of claim 1, wherein the solid carboxylic acid alkali salt is derived from succinic acid, adipic acid, maleic acid, glutaric acid, itaconic acid, heptanedioic acid, o-phthalic acid, butanetetracarboxylic acid, or methylsuccinic acid.

9. A method of making an article of claim 1 comprising:
   providing a substrate;
   applying a carboxylic acid alkali salt solution to the substrate to form a coated substrate; and
   drying the coated substrate.

10. A method comprising contacting a gas comprising an acid gas with the article of claim 1 to remove at least a portion of the acid gas from the gas.

11. A method comprising contacting a gas comprising an acid gas with a solid carboxylic acid alkali salt to remove at least a portion of the acid gas from the gas; wherein the solid carboxylic acid alkali salt is derived from a carboxylic acid having at least one dissociation constant greater than or equal to 5.

12. The method of claim 10, which comprises contacting the gas with the article at a temperature of from 0° C. to 100° C.

13. The method of claim 10, further comprising regenerating the article by removing at least a portion of the acid gas from the article.

14. The method of claim 13, wherein regenerating the article comprises contacting the article with water.

15. The method of claim 13, which comprises regenerating the article at a temperature above 100° C.

16. The method of claim 10, which comprises regenerating the article without external heating.

17. The method of claim 10, wherein the acid gas is carbon dioxide.

18. The method of claim 10, wherein the acid gas is hydrogen sulfide.

19. The method of claim 11, further comprising regenerating the solid carboxylic acid alkali salt.

20. The method of claim 11, wherein the regenerating the solid carboxylic acid alkali salt comprises contacting the solid carboxylic acid alkali salt with water.

21. The method of claim 11, which comprises regenerating the solid carboxylic acid alkali salt without external heating.

22. The method of claim 11, wherein the acid gas is carbon dioxide.

23. The method of claim 11, wherein the acid gas is hydrogen sulfide.

* * * * *